(12) United States Patent
Fromm

(10) Patent No.: US 11,485,110 B2
(45) Date of Patent: Nov. 1, 2022

(54) CROSS LAYER FIBER ENTANGLEMENT TO INCREASE STRENGTH OF 3D PART

(71) Applicant: Xerox Corporation, Norwalk, CT (US)

(72) Inventor: Paul M. Fromm, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 871 days.

(21) Appl. No.: 16/369,854

(22) Filed: Mar. 29, 2019

(65) Prior Publication Data
US 2020/0307147 A1 Oct. 1, 2020

(51) Int. Cl.
*B32B 5/06* (2006.01)
*B29C 64/147* (2017.01)
(Continued)

(52) U.S. Cl.
CPC ............. *B32B 5/06* (2013.01); *B29C 64/147* (2017.08); *B29C 64/165* (2017.08); *B29C 64/307* (2017.08); *B32B 5/022* (2013.01); *B32B 5/26* (2013.01); *B32B 37/18* (2013.01); *B32B 38/04* (2013.01); *B33Y 30/00* (2014.12); *B33Y 40/20* (2020.01); *D04H 1/14* (2013.01); *D04H 1/22* (2013.01); *D04H 18/02* (2013.01); *B29K 2267/00* (2013.01); *B29K 2277/00* (2013.01); *B29K 2277/10* (2013.01);
(Continued)

(58) Field of Classification Search
CPC ............... B29C 64/147; B29C 64/165; B29C 64/307; B32B 37/18; B32B 38/04; B33Y 30/00; B33Y 40/20; D04H 1/22; D04H 18/02
See application file for complete search history.

(56) References Cited

U.S. PATENT DOCUMENTS 3,473,205 A 10/1969 Zocher
3,774,273 A 11/1973 Okamoto et al.
(Continued)

FOREIGN PATENT DOCUMENTS

EP 2776233 12/2017
WO WO2014134224 9/2014

OTHER PUBLICATIONS

Wikipedia (2018). Augmented Reality. Wikipedia, the free encyclopedia. Dec. 6, 2018 from https://en.wikipedia.org/wiki/Augmented_reality.
(Continued)

*Primary Examiner* — Michael M. Robinson
(74) *Attorney, Agent, or Firm* — Caesar Rivise, PC

(57) ABSTRACT

A printed sheet fiber entanglement apparatus entangles fibers from neighboring printed fibrous layers (e.g., sheets) with one another. As a stack of printed fibrous sheets is built up, periodically a holey plate is loaded against the top sheet of the stack. The guide plate may move the sheet down over the registration pins, and then an array of felting needles are thrust into the stack. An array of needles with upward and/or downward facing barbs is thrust thought holes in the guide plate into the stack through printed sheets closest to the guide plate. As the needles pushed into or are withdrawn from the stack, barbs on the felting needles intertwine fibers from the fibrous sheets through printed marking material and with neighboring sheets. The needle array may translate slightly between multiple thrusts so that a subsequent needling thrust may occur in a slightly new location.

20 Claims, 6 Drawing Sheets

(51) Int. Cl.

| | | |
|---|---|---|
| *B29C 64/307* | (2017.01) | |
| *B29C 64/165* | (2017.01) | |
| *D04H 1/14* | (2006.01) | |
| *D04H 1/22* | (2006.01) | |
| *B32B 5/02* | (2006.01) | |
| *B32B 5/26* | (2006.01) | |
| *B32B 37/18* | (2006.01) | |
| *B32B 38/04* | (2006.01) | |
| *D04H 18/02* | (2012.01) | |
| *B33Y 40/20* | (2020.01) | |
| *B33Y 30/00* | (2015.01) | |
| *B29K 267/00* | (2006.01) | |
| *B29K 307/04* | (2006.01) | |
| *B29K 277/00* | (2006.01) | |

(52) U.S. Cl.
CPC ....... *B29K 2307/04* (2013.01); *B32B 2250/20* (2013.01); *B32B 2260/023* (2013.01); *B32B 2260/046* (2013.01); *B32B 2262/0261* (2013.01); *B32B 2262/0269* (2013.01); *B32B 2262/0276* (2013.01); *B32B 2262/106* (2013.01); *B32B 2305/28* (2013.01); *B32B 2313/04* (2013.01); *B32B 2367/00* (2013.01); *B32B 2377/00* (2013.01); *D10B 2101/12* (2013.01); *D10B 2331/021* (2013.01); *D10B 2331/04* (2013.01)

(56) References Cited

U.S. PATENT DOCUMENTS

| | | | |
|---|---|---|---|
| 5,173,733 A | | 12/1992 | Green |
| 5,943,125 A | | 8/1999 | King et al. |
| 5,987,929 A | * | 11/1999 | Bostani .................. D04B 35/00 66/1 R |
| 6,377,758 B1 | | 4/2002 | OuYang et al. |
| 7,050,078 B2 | | 5/2006 | Dempski |
| 7,324,081 B2 | | 1/2008 | Friedrich et al. |
| 7,463,149 B2 | | 12/2008 | Friedrich et al. |
| 8,116,585 B2 | | 2/2012 | Wu et al. |
| 8,496,370 B2 | | 7/2013 | Hsu |
| 8,756,894 B2 | | 6/2014 | Swartz et al. |
| 8,786,686 B1 | | 7/2014 | Amirparviz |
| 9,266,287 B2 | | 2/2016 | Kautz et al. |
| 9,393,770 B2 | | 7/2016 | Swartz et al. |
| 9,507,788 B2 | | 11/2016 | Pavlov et al. |
| 9,683,950 B2 | | 6/2017 | Sarrazin et al. |
| 9,740,974 B2 | | 8/2017 | Kumar et al. |
| 9,776,376 B2 | | 10/2017 | Swartz et al. |
| 9,827,754 B2 | | 11/2017 | Swartz et al. |
| 9,833,949 B2 | | 12/2017 | Swartz et al. |
| 10,046,552 B2 | | 8/2018 | Swartz et al. |
| 2002/0133264 A1 | | 9/2002 | Maiteh et al. |
| 2006/0255525 A1 | | 11/2006 | Dinatale et al. |
| 2013/0171431 A1 | | 7/2013 | Swartz et al. |
| 2014/0085620 A1 | | 3/2014 | Lobovsky et al. |
| 2014/0238173 A1 | | 8/2014 | Swartz et al. |
| 2014/0257549 A1 | | 9/2014 | Swartz et al. |
| 2015/0034123 A1 | | 2/2015 | Pressacco et al. |
| 2015/0158246 A1 | | 6/2015 | Swartz et al. |
| 2015/0231825 A1 | | 8/2015 | Swartz et al. |
| 2016/0082657 A1 | | 3/2016 | Swartz et al. |
| 2016/0082658 A1 | | 3/2016 | Swartz et al. |
| 2016/0260261 A1 | | 9/2016 | Hsu |
| 2016/0297142 A1 | | 10/2016 | Bheda et al. |
| 2016/0339645 A1 | | 11/2016 | Swartz et al. |
| 2017/0106565 A1 | | 4/2017 | Keoshkerian et al. |
| 2017/0144426 A1 | | 5/2017 | Moore et al. |
| 2017/0151719 A1 | | 6/2017 | Swartz et al. |
| 2017/0274595 A1 | * | 9/2017 | Swartz .................. B29C 64/35 |
| 2017/0291223 A1 | | 10/2017 | Swartz et al. |
| 2017/0297303 A1 | | 10/2017 | Swartz |
| 2017/0368744 A1 | | 12/2017 | Zona et al. |
| 2018/0008141 A1 | | 1/2018 | Krueger |
| 2018/0022065 A1 | | 1/2018 | Swartz et al. |
| 2018/0072001 A1 | | 3/2018 | Swartz et al. |
| 2018/0141305 A9 | | 5/2018 | Swartz et al. |
| 2018/0264725 A1 | | 9/2018 | Swartz et al. |
| 2018/0264732 A1 | | 9/2018 | Swartz et al. |
| 2019/0067077 A1 | | 2/2019 | Muramoto |
| 2019/0299519 A1 | * | 10/2019 | Yeoh .................. B33Y 70/00 |

OTHER PUBLICATIONS

Impossible Objects' CBAM Pilot Project (video), https://www.youtube.com/watch?v=Dn37IXU2K0M, retrieved Dec. 12, 2018.

\* cited by examiner

CROSS LAYER FIBER ENTANGLEMENT TO INCREASE STRENGTH OF 3D PART

FIELD OF DISCLOSURE

This disclosure relates generally to systems and methods for composite-based additive manufacturing, and more particularly, to such process that render individual laminate layers to be built up to form and/or manufacture three-dimensional objects, parts and components (3D objects).

BACKGROUND

Traditional object, part and component manufacturing processes, which generally included varying forms of molding or machining of output products, have expanded to include commercial implementations of a new class of techniques globally referred to as "additive manufacturing" or AM techniques. These AM techniques generally involve processes, alternatively referred to as "Solid Freeform Fabrication (SFF)" or "3D printing" in which layers of additive materials, sometimes toxic or otherwise hazardous in an unfinished state are sequentially deposited on an in-process 3D object according to a particular material deposition and curing scheme. As each layer is added in the 3D object forming process, the new layer of material is added and adhered to the one or more already existing layers. Each AM layer may then be individually cured, at least partially, prior to deposition of any next AM layer in the 3D object build process. This sequential-layer material addition/joining throughout a 3D work envelope is executed under automated control of varying levels of sophistication.

AM manufacturing techniques include, but are not limited to, those techniques that have come to be referred to broadly as "3D printing" techniques usable for producing 3D printed objects. 3D printing techniques employ one or more processes that are adapted from, and appear in some respects to be similar to, well-known processes for forming two-dimensional (2D) printed images on image receiving media substrates. Significant differences in the output structures produced by the 3D printing techniques are generally based on (1) a composition of the deposited materials that are used to form the output 3D printed objects from the 3D printer; and/or (2) a number of passes made by the "print" heads in depositing comparatively large numbers of successive (and very thin) layers of the deposition material to build up the layers to the form of the output 3D printed objects.

A number of powder-based AM techniques have been commercialized. These include Selective Laser Sintering (SLS), as well as certain adaptations of toner-based 2D printing technologies for 3D printing. Those of skill in the art recognize that, in certain of these implementations, no separate support structures are typically required to support the creation of certain complex shapes. In certain of these processes, powdered materials are selectively consolidated into 3D objects with excess powder being manually removed. In an SLS process, for example, a thin layer of powder is deposited in a workspace container and the powder is then fused together using a laser beam that traces the shape of the desired cross-section. The process is repeated by depositing layers of powder thus building the 3D object in this manner layer by layer. In a typical toner-based 3D printing process, a binder material selectively binds powder deposited in layers in a printing technology used to generally print the binder in a shape of a cross-section of the 3D object on each layer of powder.

An expanding number of AM or 3D printing processes and techniques are now available. Principal distinguishing characteristic between the multiplicities of these AM or 3D printing processes are in the manner in which the layers are deposited to create the output 3D objects, and in the materials that are used to form the output 3D objects.

Certain of the AM techniques (as this term will be used throughout the balance of this disclosure to refer to various 3D object layering and build techniques including 3D printing) melt or soften materials to produce the build layers using techniques such as, for example, selective laser melting or sintering of an input material through applied heat. Others of the AM manufacturing techniques deposit and cure liquid materials using technologies for the deposition of those liquid materials such as jetted (ink) material "printing" techniques.

Some 3D printers use a process of printing plastic in the image of the part cross section onto a fibrous sheet, such as carbon fiber, and then stacking many sheets to form a stack that will become a 3D part after the stack is heated to melt or cure the plastic and the stack compressed. Excess unbonded fibrous sheet is removed via sand blasting or other methods. Part strength is dominated by the fiber strength. Layer to layer strength is dominated by the plastic binder strength. It would be beneficial to increase layer to layer strength of the 3D part.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a printed sheet fiber entanglement apparatus for entangling stacked printed fibrous sheets from an additive manufacturing system, with the printed sheet fiber entanglement apparatus having a bed plate, a registration pin, a guide plate, a needle board and an array of felting needles. The bed plate may support a stack of printed fibrous sheets, with each printed fibrous sheet patterned for a slice of a desired 3D object and including a registration aperture. The registration pin is aligned with the bed plate and extends through the registration aperture to maintain the printed fibrous sheets of the stack in alignment on the bed plate. The guide plate is aligned with the bed plate and has an array of apertures extending vertically there through. The guide plate may reciprocate towards the bed plate to a first position against the stack of printed fibrous sheets, and away from the bed plate to a second position that allows placement of an additional printed fibrous sheet onto the stack. The needle board is adjacent the guide plate opposite the bed plate. The array of felting needles is held by the needle board and extends towards the bed plate with the array of felting needles in alignment with the guide plate array of apertures. The felting needles are disposed for insertion through the array of apertures when the guide plate is in the first position, and further for insertion through a plurality of the printed fibrous sheets adjacent the guide plate. The felting needles have a barb on a peripheral surface thereof configured to move fibers from one of the plurality of printed fibrous sheets of the stack to a neighboring printed fibrous sheet of the stack.

According to aspects illustrated herein, an exemplary method for fiber entanglement of printed fibrous sheets to bond a stack of the printed fibrous sheets is described. The method may include placing a printed fibrous sheet on top of another printed fibrous sheet to form the stack of printed fibrous sheets on a bed plate, with each printed fibrous sheet patterned for a slice of a desired 3D object and including a registration aperture, and one of the printed sheets having fibers therein. The placing of the printed fibrous sheet including aligning the printed fibrous sheet with the printed fibrous sheet via a registration pin aligned with the bed plate and extending through the registration aperture of the printed fibrous sheet. The method may further include applying pressure to the stack of printed fibrous sheets with a guide plate in a first position pressed against the stack of printed fibrous sheets, the guide plate having an array of apertures extending vertically there through, and reciprocating an array of felting needles held by a needle board and extending towards the bed plate through the guide plate array of apertures and a plurality of the printed fibrous sheets adjacent the guide plate. The reciprocating includes inserting the felting needles through the array of apertures when the guide plate is in the first position and further inserting the felting needles through a plurality of the printed fibrous sheets adjacent the guide plate. The reciprocating further includes withdrawing the felting needles out of the stack of printed fibrous sheets, with the felting needles having a barb configured to intertwine fibers from one of the plurality of printed fibrous sheets of the stack with fibers of a neighboring printed fibrous sheet of the stack during the reciprocating.

According to aspects described herein, a stacker subsystem of an additive manufacturing system includes a punch holder, a die holder, a punch plate, a bed plate, a registration pin, a guide plate, a needle board and an array of felting needles. The punch holder is aligned with the die holder, with the punch holder configured to reciprocate towards and away from the die holder in a direction transverse to a delivery path for the printed substrate web fed between the punch holder and the die holder. The punch holder has a cavity therein with a cavity opening adjacent the die holder. The die holder has a channel there through corresponding with the cavity of the punch holder, with the punch holder and the die holder configured to receive the printed substrate web there between. The printed substrate web has a plurality of printed fibrous sheets, with each printed fibrous sheet patterned for a slice of a desired 3D object and including a registration aperture. The punch plate is slidingly received within the cavity in a peripherally spaced relation, with the punch plate configured to reciprocate in the direction transverse to the delivery path of the printed substrate web between a recessed position in the punch holder and a cutting position extended into the channel of the die holder to sever a substrate sheet from the printed substrate web. The punch plate has an inner periphery wall defining an aperture. The bed plate is configured to support a stack of the severed printed fibrous sheets. The registration pin is aligned with the bed plate and extends through the registration aperture to maintain the severed printed fibrous sheets of the stack in alignment on the bed plate. The guide plate is aligned with the bed plate and has an array of apertures extending vertically there through. The guide plate is configured to reciprocate towards the bed plate to a first position urging the severed printed fibrous sheet against the stack of severed printed fibrous sheets, and away from the bed plate to a second position that allows placement of an additional severed printed fibrous sheet onto the stack. The needle board is adjacent the guide plate opposite the bed plate. The array of felting needles is held by the needle board and extends towards the bed plate with the array of felting needles in alignment with the guide plate array of apertures. The felting needles are disposed for insertion through the array of apertures when the guide plate is in the first position, and also for insertion through a plurality of the severed printed fibrous sheets adjacent the guide plate. The felting needles have a barb on a peripheral surface thereof configured to move fibers from one of the plurality of severed printed fibrous sheets of the stack to a neighboring severed printed fibrous sheet of the stack.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
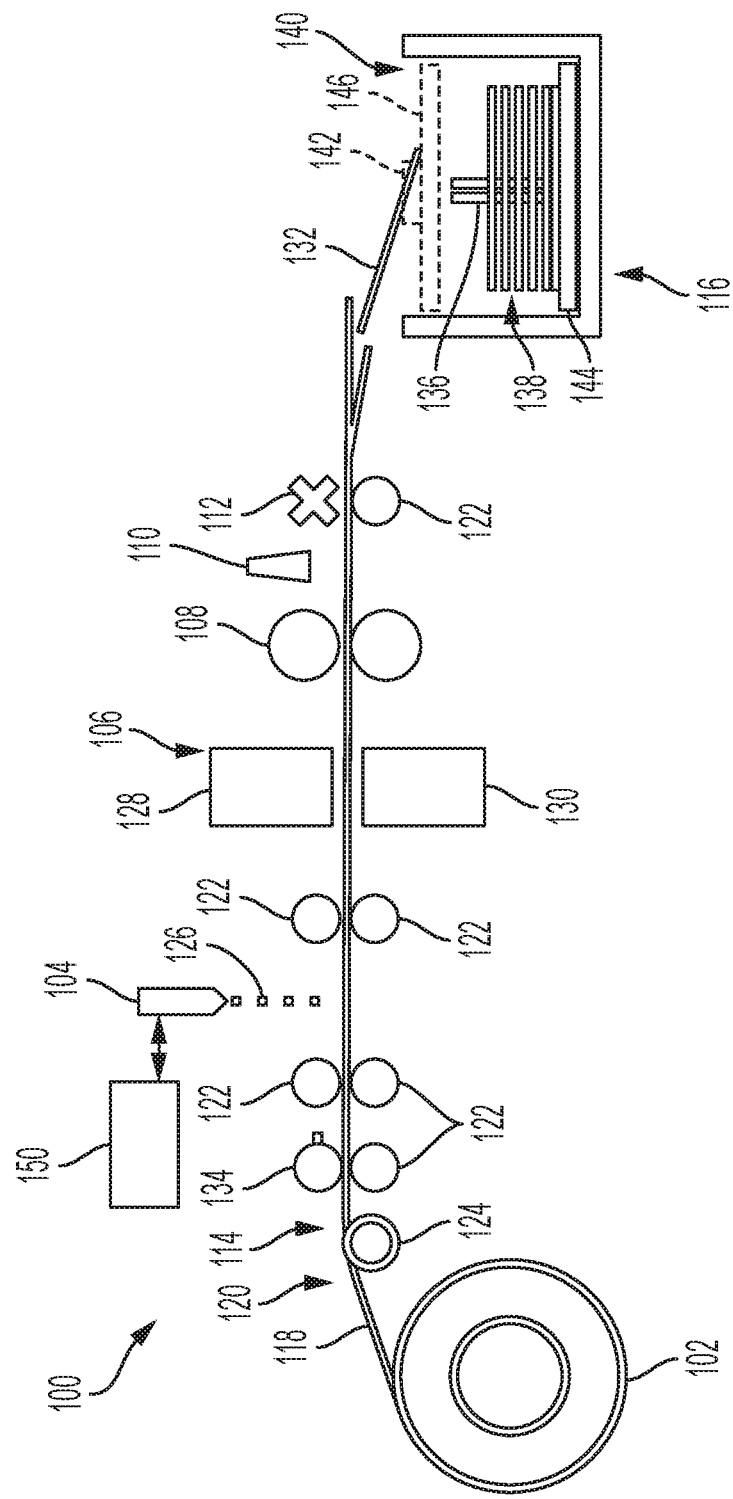
FIG. 1 is a side view of an additive manufacturing system for printing 3D objects in accordance with an example of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for printing onto a substrate web and automatically stacking individual sheets of the web for AM manufacturing.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "media", "web", "web substrate", "print substrate" and "substrate sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, carbon fiber reinforced material and foils, as readily understood by a skilled artisan.

The term "marking material" as used herein may refer to printing matter deposited by an image forming device onto a web substrate to form an image on the substrate. The listed term "marking material" may include inks, toners, metal particles, plastics, pigments, powders, molten materials, polyamide, nylon, glass filled polyamide, epoxy resins, bio-based resins, wax, graphite, graphene, carbon fiber, photopolymers, polycarbonate, polyethylene, Polylactic acid (PLA), Polyvinyl alcohol (PVA), ABS filament, high-density polyethylene (HDPE), high impact polystyrene (HIPS), Polyethylene terephthalate (PETT), ceramics, conductive filament and other ink jet materials.

The term 'image forming device", "printing device" or "printer" as used herein encompasses any apparatus that performs a print outputting function for any purpose, such as a digital copier, scanner, image printing machine, xerographic device, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like. An image forming device can handle sheets, webs, marking materials, and the like. An image forming device can place marks on any surface, and the like and is any machine that reads marks on input sheets; or any combination of such machines. A 3D printer can make a 3D object, and the like. It will be understood that the structures depicted in the figures may include additional features not depicted for simplicity, while depicted structures may be removed or modified.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The examples further include at least one machine-readable medium comprising a plurality of instructions, when executed on a computing device, to implement or perform a method as disclosed herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

As used herein, unless otherwise specified, the term "object" can also mean part, element, piece, or component. As used herein, an object refers to a 3D object to be individually built, or actually built, by a 3D printing system (printer). An object, as referred herein, is built by successively adding layers so as to form an integral piece. Some printers are capable of building, as part of the same print job, a plurality of independent pieces from a 3D model including a plurality of independent 3D objects. An object may include void spaces embedded in the object body.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

FIG. 1 is a block diagram of an exemplary AM system 100 for printing 3D objects. The AM system 100 may include components such as a material feeder 102, an image-forming device 104, a powder subsystem 106, a fuser 108, a sensor 110, a cutter 112, a transfer subsystem 114, a stacker subsystem 116, and other features that connect and control the various components. While exemplary components are shown in FIG. 1, various alternative and optional components are also suitable for use with the system 100.

In illustrative implementations, a three-dimensional (3D) object is printed in accordance with a computer 3D model of the object, created by a computer-aided design (CAD) program. For example, the CAD program may be a free-form non-uniform rational basis spline (NURBS) program, or the CAD program may be Solid Works®. In the AM system 100, marking material 148 (e.g., powder) (FIG. 4) is selectively deposited by powder subsystem 106 in a physical pattern on a substrate material 118 (or substrate sheets thereof) that corresponds to a "positive image' of a thin slice or layer of the 3D object as defined by image forming device 104. For each slice of the 3D object, powder is attached in a pattern that correspond to positions in the slice where the 3D object exists, and powder is not attached to the substrate in positions in the slice where the 3D object does not exist. Thin slices of the 3D CAD model may be created, for example, by starting with a 3D model in STL file format and using the Slice Commander feature of Netfabb® Studio software (available from netfabb GmbH, Parsberg, Germany) to create the thin slices. This cycle of selectively patterning substrate sheets repeated for as many additional substrate sheets as required for making the specified 3D part or object, with each sheet normally representing a layer of the 3D part or object.

The material feeder 102 holds the substrate material 118 (e.g., carbon fiber, paper) in roll or sheet form (here shown in roll form for example) and places the substrate material in proper position for transfer to the image-forming device 104. The substrate material 118 may be transferred to the image-forming device 104 via the transfer subsystem 114, which may include a tensioning mechanism 120 together with feed rollers 122 used to hold and advance the web defined by the length of the substrate material fed through the AM system 100. The tensioning mechanism 120 may include one or more rollers 124 situated to keep the substrate material 118 taught as it is fed components of the AM system. The web of substrate material 118 can extend through all of the components of the AM system, including the image-forming device 104, the powder subsystem 106, the fuser 108, the sensor 110, and then be cut by the cutter 112 into single sheets prior to stacking, as discussed in greater detail below.

The image-forming device 104 may then deposit a pattern of an adhering agent (e.g., fluid 126) in image-wise fashion at precise locations onto the substrate material 118. The fluid 126 is selectively deposited on the substrate material 118 so that some parts of the material are covered with liquid as a positive image of a slice of a 3d object, and some parts of the material are not. The pattern of fluid 126 may be deposited via a variety of approaches. For example, the image-forming device 104 may include a thermal inkjet head or a piezoelectric inkjet head to dispense the fluid. In examples, the image-forming device 104 may apply air pressure to dispense the fluid 126. The image-forming device 104 may also include a solenoid valve if air pressure is used to control the release of air or dispensing of fluid.

In some cases, the fluid that is selectively deposited may be water or an aqueous solution that includes a material that slows the evaporation of water. For example, the aqueous solution may include 2-pyrrolidinone. In other cases, a different fluid, such as an alcohol may be selectively deposited. For example, if the substrate material 118 is water sensitive (e.g. polyvinyl alcohol, PVOH), then water may distort or dissolve the substrate material. In that case, an alcohol may be used as the fluid that is selectively deposited. In some cases, to prevent a liquid fluid that is selectively deposited from spreading or being excessively absorbed into the substrate, it is helpful to apply a surface energy modifier or repellent to the substrate before selectively depositing the liquid fluid.

The material feeder 102 then transfers the substrate material 118 to the powder subsystem 106, which includes a powder applicator 128 and a powder remover 130 that may be provided as separate components or integrated into a single component. In either arrangement, the powder applicator 128 is configured to deposit a 3D object powder (e.g., thermoplastic powder) onto the substrate material. The powder is configured to adhere to the areas of the substrate that have been made wet by the image-forming device 104, i.e., the layer images. In other words, the powder applicator 128 deposits powder, such as, but not limited to, thermoplastic powder, onto the surface of the substrate material 118 on which patterned layer shapes have just been printed. The powder sticks to the printed (wet) areas on the substrate material or sheet thereof, but does not adhere to portions of the substrate that are not covered with the fluid.

In typical application, the powder applicator 128 may include a trough containing the powder. The trough may have a slitted opening on its underside and is connected to an electromechanical vibrator of the powder subsystem. The vibrator, when active, causes the powder to flow downward through the slitted opening and out of the trough onto the substrate while it moves under the trough. The vibrator is actuated by a controller 150 that may include a sensor circuit that senses the presence of the patterned fluid on the substrate underneath. When the patterned fluid has completely passed, the vibrator may deactivate to cease powder flow from the trough.

The powder may be selectively deposited by other approaches. For example, the powder may be selectively deposited by flooding one side of a layer of substrate with powder, then selectively heating the opposite side of the substrate with an appropriate device such as a thermal print head. In this approach, the thermal print head includes a high-resolution array of heating elements, which may be selectively turned on or off. In the areas that are heated, the powder melts and adheres to the substrate. The excess powder that has not adhered is removed, for example by vacuuming the excess powder by the powder remover 130 or turning the substrate over with the excess powder falling off the substrate via gravity.

Alternatively, powder may be deposited using a selective deposition technique similar to that employed in xerographic printing. In this approach, an electrical charge is imparted to powder particles, which are directed toward the substrate 118 and then selectively adhere to some portions of the substrate, but not others due to electrostatic attraction or repulsion. The powder particles adhere to portions of the substrate that have an opposite electrical charge, or that are adjacent to a substrate surface that has such a charge, and are repelled from portions of the substrate that have the same electrical charge or that are adjacent to a substrate surface that has such a charge.

The powder may be alternatively deposited using a selective deposition technique similar to that employed in magnetographic printing. In this approach, powder selectively adheres to some portions of the substrate layer, but not others due to magnetostatic interactions between the powder and the substrate surface, or a substrate layer adjacent to the substrate surface. For example, the powder may be a single component magnetic toner, a colloidal suspension (e.g., a ferrofluid), or a dual component toner. A variety of magnetic pigments, such as magnetite or ferric oxide (FeO), may be used for the toner powder in this approach.

In all of the above examples, the step of selectively depositing powder may include a substep of directing solid powder toward the substrate 118 in a non-selective manner. For example, this substep may include flooding the entire surface of the substrate with powder. Or for example, in the xerographic or magnetographic examples, this substep may include sending electrically charged or magnetized powder toward the entire substrate layer.

Still referring to FIG. 1, the powder remover 130 then removes any powder that does not adhere to the substrate. The powder may be removed from the substrate, for example, by vacuuming the excess powder off as it moves adjacent the powder remover. In typical application, the powder remover 130 may include a vacuum having a vacuum motor coupled to a cyclone (to be described later). In operation, the vacuum pulls the powder that does not adhere to the substrate, while powder applied to the printed areas remain. The cyclone may recirculate the vacuumed powder back to the powder applicator 128 for reuse, as well understood by a skilled artisan. In certain circumstances the amount of powder removal from the vacuum may be insufficient since some unwanted powder may still reside on the substrate material. For this reason the powder remover 130 may include an air knife after the vacuum to remove any remaining excess powder from the substrate. The removed excess powder may also be recirculated by the cyclone back to the powder applicator for reuse.

The powder system 106 can be set to run continuously so that, once the substrate material 118 passes the image forming device 104, the substrate automatically travels through the powder system 106. Alternatively, the controller 150 in communication with the transfer subsystem 114, the image forming device and the powder system 106 can instruct the powder applicator 128 and powder remover 130 or subsystems thereof to turn on and off at the appropriate times.

After the substrate 118 has had powder applied and excess powder removed, the remaining powder may be melted onto the substrate so that the powder more permanently affixes to the printed areas of the substrate and is thus protected from displacement, disruption, or falling off during subsequent processing steps. To this end, an optional fuser 108 may be disposed after the powder system 106. The fuser 108 may be disposed above, below, or adjacent to the substrate leading out of the powder remover 130. The fuser 108 may be, for example but not limited to, radiant, IR, or other heating approach sufficient to melt and thereby fix the patterned powder to the substrate. As the substrate 118 travels out of the powder system 106, the heat from the fuser 108 melts the powder on the substrate surface causing it to fix to the substrate.

The AM system 100 may optionally have a sensor 110 (e.g., an imaging device such as a camera) to ensure that the system has not malfunctioned, that the appropriate amount of powder is deposited, that the substrate material is moving as desired, that individual substrate sheets are moving as desired, and other quality assurance aspects of the process. The sensor may operate based, for example, on input from the controller 150, or automatically upon detection of an edge of printed material or a substrate sheet.

As noted above in the exemplary AM system 100, the roll 102 of substrate material 118 is mounted and situated ahead of the image-forming device 104. While not being limited to a particular theory, the web of substrate material 118 can extend through all of the components of the AM system, including the image-forming device 104, the powder subsystem 106, the fuser 108, the sensor 110, and then be cut by the cutter 112 into single sheets 132 prior to stacking, with the sheets corresponding to a layer of a 3D object. In examples, the web of substrate material 118 may be cut by the cutter 112 into single sheets 132 at any prior point in the process. For example, the web may be converted to a single sheet prior to advancing the resulting substrate sheet to the image-forming device 104. Likewise, the web may be converted to a single sheet after the image-forming device 104 and before the powder subsystem 106, or after the powder subsystem and before the fuser 108, or after the fuser and before the sensor 110. In examples, the web may be precut into individual sheets, with the sheets arranged as a stack of sheets held by the material feeder for individual processing by the AM system. The cutter 112 may cut the sheet with a mechanical instrument (e.g., blade, punch) or other approach (e.g., laser) as well understood by a skilled artisan.

In examples, the AM system 100 may also include a punching device 134 for placing registration apertures in the substrate material 118 or substrate sheets 132 thereof at desired locations. The registration apertures are placed in precise, pre-defined positions relative to the position of the substrate sheet for precise alignment of the patterned marking material images printed onto the sheets. This can be accomplished by mounting the punching device 134 proximate to the substrate material 118 being moved by the transfer subsystem 114, for example, on the same frame that the image-forming device 104 and powder subsystem 106 are placed, or using other alignment mechanisms that are well known in the art. The punching device 134 may include a hard instrument that pokes registration apertures out of the substrate material, or a laser cutter that cuts registration apertures from the substrate material.

In order to complete the AM process of forming a 3D object, the powder printed substrate sheets 132 may be stacked by aligning the substrate sheets via their registration apertures, and fused together to attach the stacked substrate sheets into the combined object. Then the uncoated substrate material may be removed from the combined object by, for example, abrasive blasting, chemical removal or dissolution. The stacker subsystem 116 is configured for stacking the cut printed substrate sheets 132 in register, based on the aforementioned registration apertures. As can be seen in FIG. 1, the stacker subsystem 116 receives the printed substrate sheets 132 with the registration apertures aligned about registration pins 136 of the stacker subassembly to form a stack 138 of the printed sheets.

After stacking the printed sheets, the patterned powder on the sheets may be combined and hardened into the 3D object. FIG. 1 shows the stacker subsystem 116 including a compressive device 140 including one or more elastic components (e.g., springs 142) to maintain pressure on the substrate sheets 132 even if they compress. After a number of substrate sheets (layers) have been placed in the stacker subsystem 116, one on top of the other on bed plate 144, the inserted substrate sheets may be compressed together with the spring 142 exerting presser on top plate 146 towards the bottom bed plate.

The compressed stack 138 may be heated, for example, in an oven (not shown). Heat from the oven causes the thermoplastic powder to melt. The molten material coats the substrate layers. The compressive device 140, with the substrate stack 138 in it, is then removed from the oven, and the substrate layers are allowed to cool. The molten material then solidifies. As it does so, it binds (fuses) the substrate sheets 132 together. Excess substrate (that has not been covered by the solidified material) is then removed as noted above by, for example, abrasive blasting, chemical removal or dissolution to result in a 3D printed object.

The process carried out by the AM system 100 may be sequenced and monitored using one or more controllers 150. The controller 150 may read and execute build instructions generated by an outboard computer (not depicted) based on a 3D model of the object that is to be printed. For example, the material feeder 102, image-forming device 104, powder subsystem 106, fuser 108, sensor 110, cutter 112, transfer subsystem 114, punching device 134 and stacker subsystem 116 may operate as discussed herein based on input from the controllers. Thus while the controller 150 is shown in communication with the image-forming device 104, it is understood that the controller may be in communication with any component of the AM system.

Figure 2:
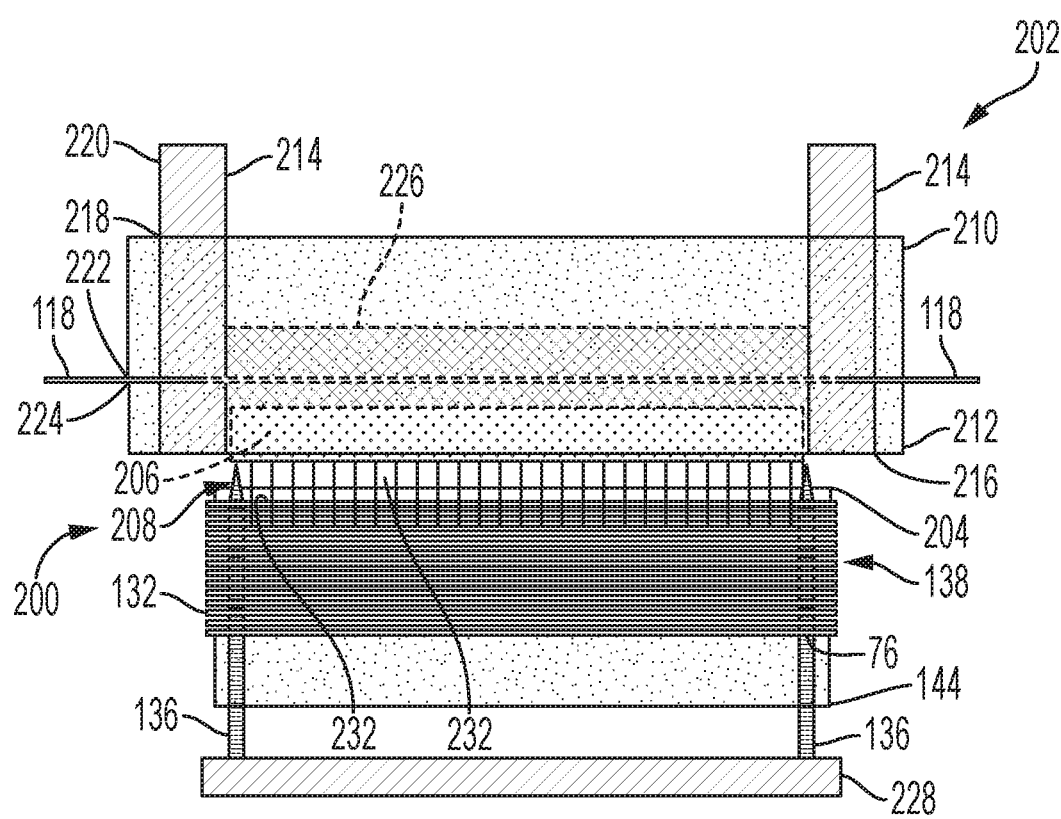
FIG. 2 is a side view of an exemplary stacker subsystem having a printed sheet fiber entanglement apparatus.

FIG. 2 depicts an exemplary stacker subsystem having a printed sheet fiber entanglement apparatus 200 in sheet alignment under a cutter 202 configured to cut printed substrate material 118 into printed fibrous substrate sheets 132. Exemplary fibrous sheets may include stiff fibers (e.g., carbon), resilient fiber (e.g., Kevlar, nylon, polyester) or any combination thereof. The entanglement apparatus 200 may be a type or part of a stacker subsystem 116 that entangles fibers from neighboring printed substrate sheets 132 with one another to make a 3D printed object. As discussed in greater detail below, as the stack 138 of printed sheets is built up, an array of needles is thrust into the stack and redirects fibers from a sheet through the printed marking material 148 (e.g., powder, melted powder) (FIG. 4) and into needled holes of neighboring sheets. While not being limited to a particular theory, the exemplary entanglement apparatus 200 may include a bed plate 144, one or more registration pins 136, a guide plate 204, a needle board 206 and an array of felting needles 208.

The cutter 202 is shown in FIG. 2 having a punch holder 210, a die holder 212, and guide posts 214 configured to maintain operative alignment of the punch holder and die holder. The guide posts 214 may be fixed to corresponding apertures 216 of the die holder 212 and stand vertically thereon. The punch holder 210 may include channels 218 receiving top end portions 220 of the guide posts 214, with operative vertical alignment of the punch holder and die holder 212 maintained by fitting the guide posts into the channels. The punch holder 210 may be provided with guide bushings between the channels 218 and guide posts 214. While the exemplary cutter 202 is shown with the guide post 214 fixed within the apertures 216 of the die holder 212 and slidably engaged within the channels 218 of the punch holder 210, it is understood that the examples are not limited to this configuration, as the guide post may be slidably engaged within at least one of the apertures and channels such that the punch holder is configured to reciprocate towards and away from the die holder in a direction (e.g., vertically) transverse to a delivery path (e.g., horizontal) that the printed substrate material 118 is fed between the punch holder and the die holder.

The punch holder 210 includes a downward facing peripheral stripper wall 222 having an inner periphery side defining a vertical punch cavity centered within the punch holder. Facing the downward facing peripheral stripper wall 222, the die holder 212 includes an upward facing die plate 224 having an inner periphery side defining a vertical die channel there through corresponding with the vertical punch cavity of the punch holder 210. While not being limited to a particular theory, the die channel may be sized at least the dimensions of a cut printed substrate sheet 132 of the printed substrate material 118 web to allow passage of the substrate material there through, for placement onto the printed sheet fiber entanglement apparatus 200 of the stacking subsystem. When separated, the punch holder 210 and the die holder 212 define a gap therebetween to receive the printed substrate material 118, which may be forwarded through the gap along a delivery path (e.g., horizontal) of the printed substrate material indicated by directional arrow A, for example by an AM system 100.

A punch plate 226 may be secured to the punch holder 210 by being inserted in the punch cavity of the punch holder. As can be seen in FIG. 2, the punch plate 226 is a cutting member shown slidingly located in a peripherally spaced relation within the aligned punch cavity and die channel. In this manner, the punch plate 226 is configured to reciprocate in a direction (e.g., vertical) transverse to the delivery path (e.g., horizontal) of the printed substrate material 118 between a recessed position in the punch holder 210 and a cutting position (FIG. 2) extended into the die channel 40 of the die holder 212 to sever a printed substrate sheet 132 from the printed substrate material. The punch plate 226 may generally be shaped as a cuboid. For purposes of possible integration with the printed sheet fiber entanglement apparatus 200, the cuboid may be a hollow cuboid having an inner periphery side defining an aperture.

As noted above, the fiber entanglement apparatus 200 may include a bed plate 144, one or more registration pins 136, a guide plate 204, a needle board 206 and an array of felting needles 208. The bed plate 144 is configured to support a stack of cut printed substrate sheets 132. The substrate sheets 132 may be printed fibrous sheets, for example carbon fiber sheets, with the printed fibrous sheets patterned for a slice of a desired 3D object. The fibrous sheets may include registration apertures placed in precise, pre-defined positions relative to the sheets for precise alignment of the patterned marking material images printed on the sheets. The registration apertures may be formed via the punching device 134 proximate to the substrate material 118 being moved by the transfer subsystem 114 as described above an shown by example in FIG. 1. The registration pins 136 extend from the bed plate 144 and are shown extending through registration apertures of the cut printed substrate sheets 132 to keep the sheets in alignment on the bed plate in stacked configuration.

Still referring to FIG. 2, the printed sheet fiber entanglement apparatus 200 is shown integrated with the cutter 202. The integration is an exemplary showing, as the fiber entanglement apparatus 200 may be integrated with the cutter 202, or separate from the cutter, such as the cutter 112 shown in FIG. 1. When shown in alignment under the cutter 202, individual substrate sheets 132 cut by the punch plate 226 fall onto the bed plate 144 or onto a previously cut neighboring sheet, with the fallen sheets aligned as registration apertures of the sheets fall down respective registration pins 136. The bed plate 144 and registration pins 136 may be part of the stacker subsystem 166 that also includes a base 228 that holds the registration pins and fixes them in position through the bed plate 144 and registration apertures of the stacked substrate sheets 132.

The guide plate 204 may be aligned over the bed plate 144 and is configured to reciprocate towards the bed plate to a first position against the stack of printed fibrous sheets, and a second position away from the bed plate that allows placement of additional printed fibrous sheets 132 onto the stack as well understood by a skilled artisan. The guide plate 204 includes an array of needle apertures 230 extending vertically there through. The needle apertures may be generally circular across a surface plane of the guide plate 204. In examples, the needle apertures may have other shapes, such as an oval or elongated slotted shape across the guide plate surface plane.

Figure 3:
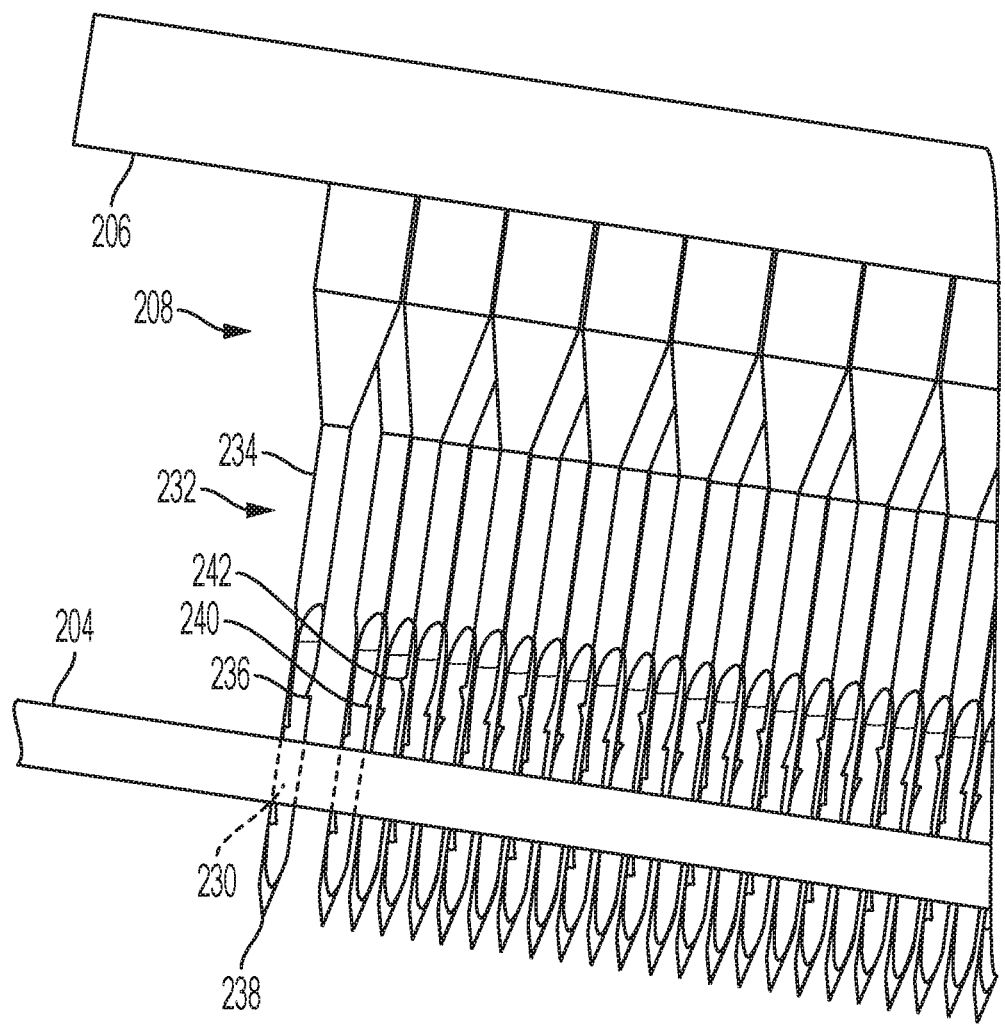
FIG. 3 is a side view of a segment of a needle board, array of felting needles and guide plate of the printed sheet fiber entanglement apparatus of FIG. 2.
Figure 4:
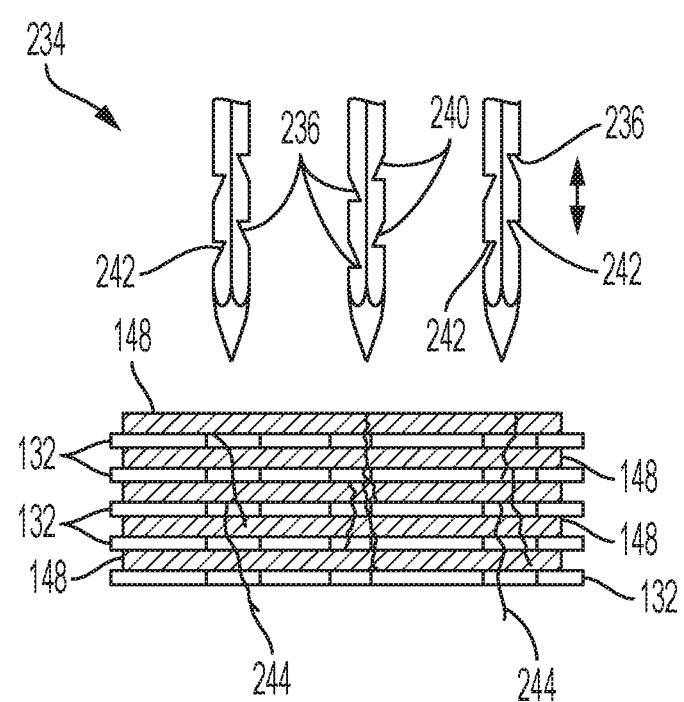
FIG. 4 is a side exploded view showing a section of the stack of fibrous sheets after withdrawal of the felting needles in accordance with an example.

Mounted above the stacked fibrous substrate sheets 132 in a needle board 206, in a known manner, is an array of felting needles 208. A segment of the needle board 206 is also shown in FIG. 3 in order to illustrate the needles in enlarged view passing through the guide plate 204. The needle board and hence felting needles 232 of the array 208 are disposed for projection at least partly through the stack 138 of the cut printed substrate sheets 132 such as shown by example in FIG. 2 by reciprocation by conventional approaches which are also not shown. As can be seen in FIGS. 3 and 4, the felting needles 232 may include a shank 234, barbs 236 on a peripheral surface of the shank, and a needle point 238. While not being limited to a particular arrangement, the barbs 236 may be upward facing barbs 240 or downward facing barbs 242, with the upward facing barbs pointed or facing towards the needle board 206, and the downward facing barbs pointed or facing towards the needle point 238.

The array of felting needles 208 held by the needle board 206 project towards the bed plate 144 with the array of felting needles in alignment with the guide plate 204 needle apertures 230 (FIG. 3). The reciprocating felting needles 233 may be disposed for insertion through the needle apertures 230 when the guide plate 204 is positioned against the stack 138 of printed fibrous sheets 132, and further for insertion through at least some of the printed fibrous sheets proximate to the guide plate. During a reciprocating action of the felting needles 230 into and out of the printed fibrous sheets 132, the barbs 236 may grab and move fibers 244 from the sheets of the stack 138 to neighboring sheets of the stack. The fibers 244 are hooked with the barbs 236 of the felting needles 230 moving substantially perpendicular to the fibrous sheets 132 and penetrate with continued needle movement through printed powder and into adjacent sheets. FIG. 4 shows a section of the stack 138 of fibrous sheets 132 after withdrawal of the felting needles 230, with fibers 244 moved through holes in the sheets made by the needles and printed marking material 148 on the fibrous sheets to neighboring sheets of the stack for entanglement of the fibers from neighboring sheets with one another.

It is understood that the exemplary fiber entanglement may be provided with or without a guide plate 204, with the felting needles 232 thrust into the stack 138 of fibrous sheets often enough during the formation of the stack to entangle fibers 244 between neighboring sheets over most if not all of the stacked sheets. For example, when used with the guide plate 204, as the stack 138 of printed sheets 132 is built up, occasionally (e.g., approximately 0.5-3 mm of stack thickness increase, 1-10 MM of stack thickness increase, 1-25 mm of stack thickness) the guide plate 204 may be loaded against the top sheet of the stack. As another option, as every sheet 132 is positioned over the bed plate 144, the guide plate may move the sheet down over the registration pins 136, and then the felting needles 232 may be thrust into the stack. During operation, as the needles 232 are pushed into or are withdrawn out of the stack 138, the barbs 236 will push or pull fibers 244 from sheets 132 in the stack into needle forming holes in neighboring sheets so that the fibers are intertwined throughout the stack. For example, as the felting needles 232 reciprocate into and out of the stack 138, downward facing barbs 242 push fibers from higher sheets to lower sheets in the stack, and upward facing barbs 240 pull fibers 244 from lower sheets to higher sheets in the stack. Thus a stronger 3D object is obtained due to the intertwining of fibers 232 across neighboring sheets throughout the stack.

The array of needles 208 may be thrust thought the needle apertures 230 in the guide plate 204 and into the stack 138 with barbs 236 penetrating into the stack at least several mm. Of course such depth of penetration may be influenced by the design of the needles (e.g., distance from the barbs to the needle point 238), the proximity of the needles 232 to the bottom of the stack of cut printed substrate sheets 132 and the distance the fiber may be pushed downwards into neighboring sheets. The depth of needling may be greater than the stack thickness increase since the last needling to ensure fiber entanglement throughout the thickness or height of the stack. For example, the depth of needling may be at least double the stack thickness increase since the last needling plus the length from the needle point 238 to the barb 235 of the needle closest to the needle point.

Typical needling occurs with the needle passing through a felt being many times the thickness of the felt. While not being limited to a particular theory, the needle 232 penetration into the stack 138 may stop without passing thought the entire stack. Needle penetration through the entire stack may cause damage to the needle points 238 or bed plate 144 caused by abutment therebetween. Yet, without needle penetration through a stack of printed substrate sheets 132, some of the printed substrate sheets closest to the bed plate 244 may not have its fibers 244 entangled with neighboring sheets. To avoid this situation, initial cut sheets or some other buffer layer that are not printed with marking material that forms part of the 3D object may be placed at the bottom of the stack 138 adjacent the bed plate 144. To enable needle penetration through the entire stack, such as when the stack is thin having few substrate sheets 132, the bed plate 144 may also have an array of needle apertures (not shown) aligned with the array of felting needles 208 that permit the felting needles 232 to at least partially penetrate into the bed plate 144 far enough for the barbs 236 to entangle fibers 244 with the bottom printed substrate sheets proximate the bed plate.

The guide plate 204 and felting needle array 208 may also be moved or shifted relative to the stack 138 to a different location for subsequent sheets to create new needle holes in the sheets with each thrust into the stack. In other words, the guide plate 204 and needle array 208 could translate slightly between thrusts, as understood by a skilled artisan, so the next thrust of needling may occur in a slightly new location. In examples where the guide plate needle apertures 230 may have elongated slotted shapes across the guide plate 204 surface plane, the board may translate laterally relative to the guide plate after a withdrawal of the array of felting needles 208 out of the stack of printed fibrous sheets 138 for a subsequent insertion into the stack in a slightly new location. This may provide the benefit of greater fiber entanglement throughout the 3D object.

The cross-layer fiber entanglement may reduce the crisp boundary of the printed 3D cross sections. If this is a concern, felting needles 232 of the needle array 208 may be selectively engaged to avoid the boundary of the cross sections. That is, needling within the solid printed portions of the 3D object would be used while needles on the boundary of the 3D object would not be engage with the needle board 206 thrusting the needles into the stack 138. Felting needles 232 may be engaged with and dis-engaged from the needle board in a conventional manner known to a skilled artisan. The controller 150 may determine which felting needles should be engaged or disengaged based factors such as the shape of the 3d object being formed, the section of the 3D object being needled, the depth of the needle penetration and entanglement, etc.

Figure 5:
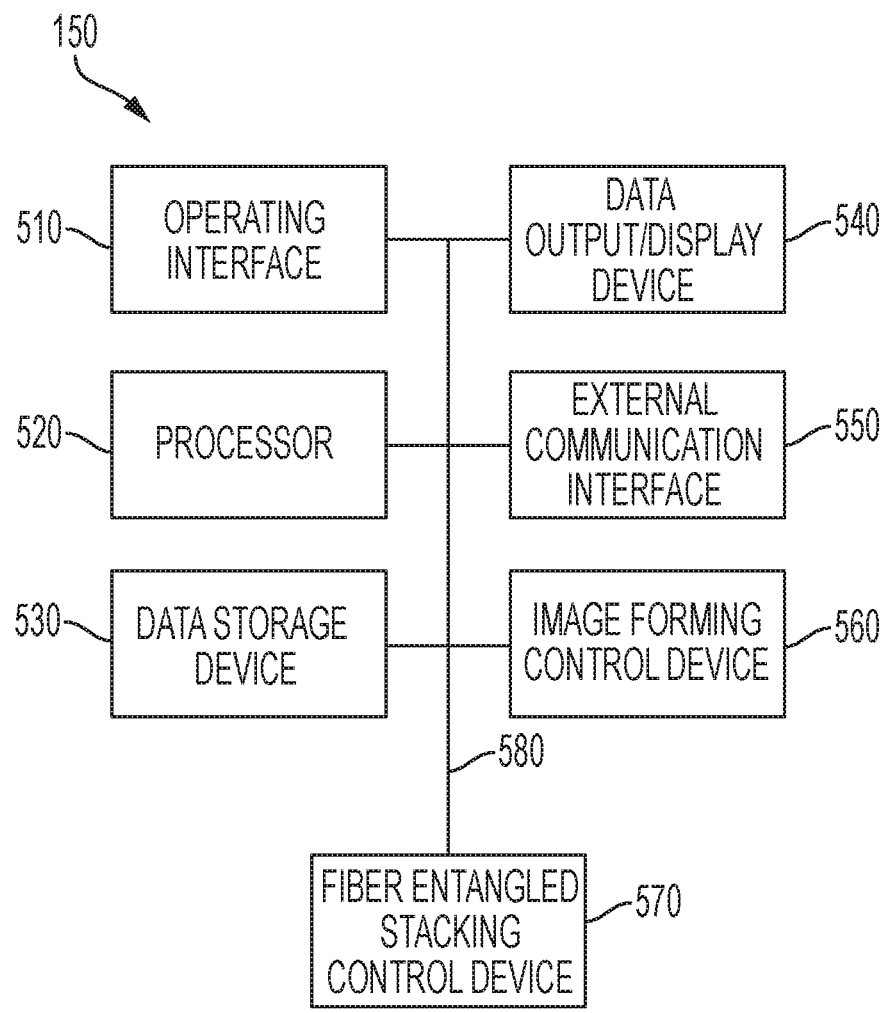
FIG. 5 illustrates a block diagram of an exemplary control system for implementing an additive manufacturing and printed sheet fiber entanglement scheme.

FIG. 5 illustrates a block diagram of the controller 150 for executing instructions to automatically control exemplary devices in the AM system 100 and printed sheet entanglement apparatus 200 illustrated in FIGS. 1-4. The exemplary controller 150 may provide input, to or be a component of a controller for executing the AM 3D object forming process in a system such as that depicted in FIGS. 1-4 and described in greater detail below in FIG. 6.

The exemplary control system 150 may include an operating interface 510 by which a user may communicate with the exemplary control system 150. The operating interface 510 may be a locally-accessible user interface associated with the AM 3D object forming system 100. The operating interface 510 may be configured as one or more conventional mechanism common to control devices and/or computing devices that may permit a user to input information to the exemplary control system 150. The operating interface 510 may include, for example, a conventional keyboard, a touchscreen with "soft" buttons or with various components for use with a compatible stylus, a microphone by which a user may provide oral commands to the exemplary control system 150 to be "translated" by a voice recognition program, or other like device by which a user may communicate specific operating instructions to the exemplary control system 150. The operating interface 510 may be a part or a function of a graphical user interface (GUI) mounted on, integral to, or associated with, the AM system with which the exemplary control system 150 is associated.

The exemplary control system 150 may include one or more local processors 520 for individually operating the exemplary control system 150 and for carrying into effect control and operating functions for AM 3D object forming, and specifically for implementing composite-based layer forming schemes, and printed sheet fiber entanglement for binding layers (e.g., sheets 132) into a 3d object. Processor(s) 520 may include at least one conventional processor or microprocessor that interpret and execute instructions to direct specific functioning of the exemplary control system 150, and control of the AM 3D object forming process and/or the printed sheet fiber entanglement process with the exemplary control system 150.

The exemplary control system 150 may include one or more data storage devices 530. Such data storage device(s) 530 may be used to store data or operating programs to be used by the exemplary control system 150, and specifically the processor(s) 520. Data storage device(s) 530 may be used to store information regarding, for example, one or more 3D object models for producing 3D objects in an AM system with which the exemplary control system 150 is associated. Stored 3D object model information may be devolved into data for the printing of a series of layers of 2D slices for forming the 3D object in the manner generally described above.

The data storage device(s) 530 may include a random access memory (RAM) or another type of dynamic storage device that is capable of storing updatable database information, and for separately storing instructions for execution of system operations by, for example, processor(s) 520. Data storage device(s) 530 may also include a read-only memory (ROM), which may include a conventional ROM device or another type of static storage device that stores static information and instructions for processor(s) 520. Further, the data storage device(s) 530 may be integral to the exemplary control system 150, or may be provided external to, and in wired or wireless communication with, the exemplary control system 150, including as cloud-based data storage components.

The exemplary control system 150 may include at least one data output/display device 540, which may be configured as one or more conventional mechanism that output information to a user, including, but not limited to, a display screen on a GUI of the AM system 100 and/or the printed sheet fiber entanglement apparatus 200 with which the exemplary control system 150 may be associated. The data output/display device 540 may be used to indicate to a user a status of a 3D object forming operation effected by the AM system with which the exemplary control system 150 may be associated including an operation of one or more individually controlled components at one or more of a plurality of separate processing stations or subsystems in the device.

The exemplary control system 150 may include one or more separate external communication interfaces 550 by which the exemplary control system 150 may communicate with components that may be external to the exemplary control system such as the printed sheet fiber entanglement apparatus 200. At least one of the external communication interfaces 550 may be configured as an input port to support connecting an external CAD/CAM device storing modeling information for execution of the control functions in the 3D object forming operations. Any suitable data connection to provide wired or wireless communication between the exemplary control system 150 and external and/or associated components is contemplated to be encompassed by the depicted external communication interface 550.

The exemplary control system 150 may include an image forming control device 560 that may be used to control the image forming process on the substrate material 118 (e.g., image forming device 104, powder subsystem 106, fuser 108) which produces the series of 2D slices (e.g., printed substrate sheets 132) for the in-process 3D object according to devolved 3D object modeling information. The substrate material 118 may be fed through the image forming device 104, powder subsystem 106 and fuser 108 to have marking material images formed thereon under the control of the image forming control device 560. The substrate material may exit the powder subsystem 106 as a printed substrate web and be cut and automatically stacked at an output side of the AM system 100 in order to constitute a stack of the printed sheets 138 for forming an object. The image forming control device 560 may operate as a part or a function of the processor 520 coupled to one or more of the data storage devices 530, or may operate as a separate stand-alone component module or circuit in the exemplary control system 150. Either of the processor 520 or the image forming control device 560 may parse the input 3D object model information to determine and execute a layer-by-layer 2D slice material layer printing scheme on the substrate material 118 in the AM system 100.

The exemplary control system 150 may include a fiber entangled stacking control device 570 coupled to one or more of the data storage devices 530, or as a separate stand-alone component module or circuit in the exemplary control system 150. The fiber entangled stacking control device 570 may be usable to control the functioning of one or more of a printed sheet stacking and printed sheet fiber entanglement process to join the individual printed sheets to one another and form a 3D object. In instances in which the printed substrate web is to be used in a printed substrate sheet fiber entangled stacking process, the same exemplary control system 150, through the cutter 202 and printed sheet fiber entanglement apparatus 200, may be usable to control the fiber entangled stacking process. In such instances, the cutter 202 and stacker subsystem 116 may be usable to blank printed substrate sheets 132 from the printed substrate web as it is fed to the cutter and to separately stack the printed substrate sheets in precise alignment for later use. Further, the printed sheet fiber entanglement apparatus 200 may bond separate printed sheets together by intertwining fibers of adjacent stacked printed sheets. Heating and further pressing the stack 138 may be provided subsequently off line as needed to not slow down the fiber entanglement process. The fiber entangled stacking control device 570 may operate as a part or a function of the processor 520 coupled to, for example, one or more data storage devices 530, or as one or more separate stand-alone component modules or circuits in the exemplary control system 150.

The exemplary control system 150 may include a 3D object finisher control device (not shown) for executing a final 3D object shaping scheme on a processed stack of cut and fiber entangled printed sheet slices in a subtractive machining process that may remove the layered support component structure and surface finish the 3D object. As with the above-enumerated other separate control devices, the 3D object finisher control device may operate as a part or a function of the processor 520 coupled to one or more data storage devices 530 for executing finishing device operations, or may operate as a separate stand-alone component module or circuit in the exemplary control system 150.

All of the various components of the exemplary control system 150, as depicted in FIG. 5, may be connected internally, and to one or more AM object forming devices and/or components thereof, by one or more data/control busses 580. These data/control busses 580 may provide wired or wireless communication between the various components of the exemplary control system 150, whether all of those components are housed integrally in, or are otherwise external and connected to an AM system 100 with which the exemplary control system 150 may be associated.

It should be appreciated that, although depicted in FIG. 5 as an integral unit, the various disclosed elements of the exemplary control system 150 may be arranged in any combination of sub-systems as individual components or combinations of components, integral to a single unit, or external to, and in wired or wireless communication with the single unit of the exemplary control system. In other words, no specific configuration as an integral unit or as a support unit is to be implied by the depiction in FIG. 5. Further, although depicted as individual units for ease of understanding of the details provided in this disclosure regarding the exemplary control system 150, it should be understood that the described functions of any of the individually-depicted components, and particularly each of the depicted control devices, may be undertaken, for example, by one or more processors 520 connected to, and in communication with, one or more data storage device(s) 530.

Figure 6:
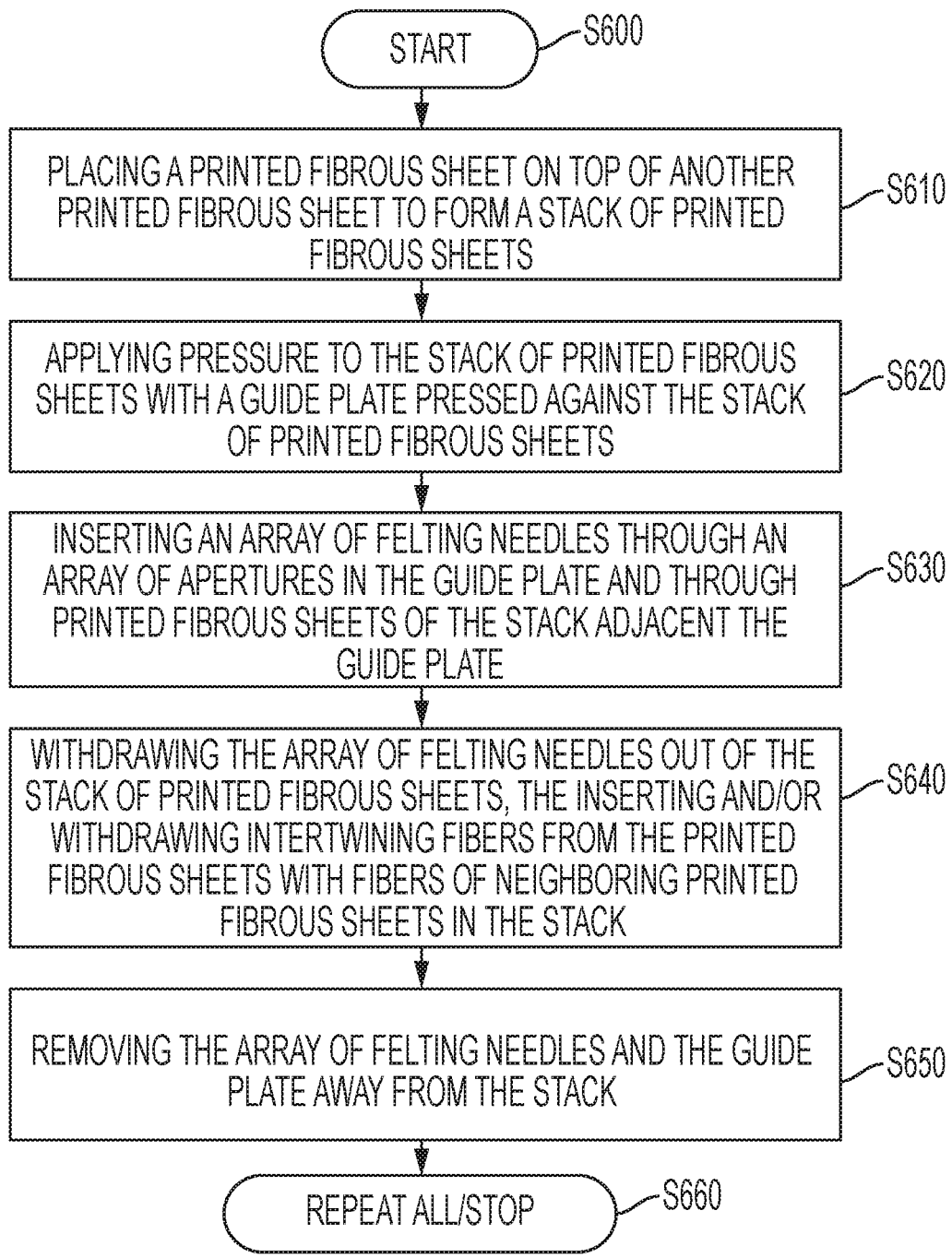
FIG. 6 is a flowchart depicting the operation of an exemplary method for fiber entanglement of printed fibrous sheets to bond a stack of the printed fibrous sheets.

The disclosed embodiments may include an exemplary method for fiber entanglement of printed fibrous sheets to bond a stack of the printed fibrous sheets into a 3D object. FIG. 6 illustrates a flowchart of such an exemplary method. As shown in FIG. 6, operation of the method commences at Step S600 and proceeds to Step S610.

At Step S610, a cut printed fibrous sheet 132 having fibers therein is placed on top of other printed fibrous sheet to form a stack of printed fibrous sheets 138 on a bed plate 144, as can be seen by example in FIG. 1. Each printed fibrous sheet 132 may be patterned as a slice of a desired 3D object and may include at least one registration aperture. The placing of the printed fibrous sheet 132 at Step S610 may include aligning the printed fibrous sheet with adjacent printed fibrous sheets via a registration pin 136 aligned with the bed plate 144 that extends through the registration aperture of the printed fibrous sheets.

Operation of the AM method proceeds to Step S620, where a guide plate 204 applies pressure to the stack of printed fibrous sheets with a guide plate in a first position pressed against the stack of printed fibrous sheets, the guide plate having an array of apertures 230 extending vertically there through. Operation of the method proceeds to Step S630.

At Steps S630 and S640, the array of felting needles 208 held by the needle board 206 are reciprocated through the guide plate array of needle apertures 230 and through printed fibrous sheets 132 adjacent the guide plate. In particular, at Step S630, the felting needles 232 are inserted through the array of apertures 230 when the guide plate 204 is in a first position pressed against the stack 138. The felting needles are further inserted through the printed fibrous sheets 132 in the stack adjacent the guide plate. Then, at Step S640, the reciprocation continues with the needle board 206 withdrawing the felting needles out of the stack of printed fibrous sheets.

As discussed above, the felting needles have a barb 236 configured to intertwine fibers from one of the plurality of printed fibrous sheets of the stack with fibers of a neighboring printed fibrous sheet of the stack during the reciprocating. In a combination of Steps S630 and S640, the array 208 of felting needles 232 is designed to reciprocate in the direction substantially transverse to the elongated plane of the cut printed substrate sheets 132 between a recessed position in the punch holder and a penetrating position extended into the stack 138 of printed substrate sheets, with the reciprocation causing barbs 236 of the felting needles to push and/or pull fibers from the stacked printed fiber sheets into neighboring printed fiber sheets, which creates a bond via the intertwined fiber entanglement between the sheets. For example, any of the barbs 236 may be an upward facing barb pulling the fibers from the one of the plurality of printed fibrous sheets of the stack into the neighboring printed fibrous sheet of the stack closer to the guide plate. Further, any of the barbs 236 may be a downward facing barb pushing fibers from the one of the plurality of printed fibrous sheets of the stack into the neighboring printed sheet of the stack closer to the bed plate with the barb.

Operation of the method shown in FIG. 6 proceeds to Steps S650, where the array of felting needles 208 and the guide plate 204 are removed away from the stack 138 of printed sheets. Once the felting needles are removed from the stack 138, then operation may cease at Step S660 to allow further processing of the stack of fiber entangled sheets, such as heating and pressing the stack or, removing excess substrate from the stack, for example as discussed above. Operation may alternatively repeat back to Step S610 to increment the stack with additional fibrous sheets that are then bonded to the stack via Steps S630 and S640.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 6, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Those skilled in the art will appreciate that other embodiments of the disclosed subject matter may be practiced with many types of image forming elements common to 3D inking system in many different configurations. For example, although single-pass marking material deposition is shown in the discussed embodiments, the examples may apply to multi-pass systems and methods, including 3d object forming systems and methods. Also, while single-side printing is shown in the discussed embodiments, the examples may apply to multi-sided printing. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A printed sheet fiber entanglement apparatus for entangling stacked printed fibrous sheets from an additive manufacturing system, comprising:
   a bed plate configured to support a stack of printed fibrous sheets, each printed fibrous sheet patterned for a slice of a desired 3D object and including a registration aperture, at least one of the printed sheets having fibers therein;
   a registration pin aligned with the bed plate and extending through the registration aperture to maintain the printed fibrous sheets of the stack in alignment on the bed plate;
   a guide plate aligned with the bed plate and having an array of apertures extending vertically there through, the guide plate configured to reciprocate towards the bed plate to a first position against the stack of printed fibrous sheets, and away from the bed plate to a second position that allows placement of an additional printed fibrous sheet onto the stack;
   a needle board adjacent the guide plate opposite the bed plate; and
   an array of felting needles held by the needle board and extending towards the bed plate with the array of felting needles in alignment with the guide plate array of apertures, the felting needles being disposed for reciprocation through a plurality of the printed fibrous sheets adjacent the guide plate via insertion through the array of apertures when the guide plate is in the first position, and further for insertion through the plurality of the printed fibrous sheets adjacent the guide plate, the felting needles having a barb on a peripheral surface thereof configured to intertwine fibers from one of the plurality of printed fibrous sheets of the stack through printed marking material on the printed fibrous sheets and with fibers of a neighboring printed fibrous sheet of the stack.

2. The apparatus of claim 1, wherein the barb is an upwards facing barb configured to pull the fibers.

3. The apparatus of claim 1, wherein the barb of one of the felting needle is an upward facing barb configured to pull the fibers, and the barb of a second one of the felting needles adjacent the one of the felting needles is a downward facing barb configured to push the fibers.

4. The apparatus of claim 1, further comprising a stacking device including a base, the bed plate and the registration pin attached to the base and extending through the bed plate towards the guide plate to maintain operative alignment of the bed plate and the base.

5. The apparatus of claim 1, wherein the apertures of the guide plate array of apertures have an elongated slotted shape across a surface plane of the bed plate, and the needle board is configured to translate laterally relative to the guide plate after a withdrawal of the array of felting needles out of the stack of printed fibrous sheets for a subsequent insertion through the plurality of printed fibrous sheets.

6. The apparatus of claim 1, wherein both the guide plate and the needle board are configured to translate laterally relative to the stack of printed fibrous sheets after a withdrawal of the array of felting needles out of the stack of printed fibrous sheets for a subsequent insertion through the plurality of printed fibrous sheets.

7. The apparatus of claim 1, wherein the fibers are one of Kevlar fibers, nylon fibers and polyester fibers.

8. The apparatus of claim 1, wherein the at least one printed sheet is a hybrid fiber sheet having carbon and fibers that are one of Kevlar fibers, nylon fibers and polyester fibers.

9. A method for entangling stacked printed fibrous sheets from an additive manufacturing system, comprising:
   placing a printed fibrous sheet on top of another printed fibrous sheet to form the stack of printed fibrous sheets on a bed plate, each printed fibrous sheet patterned for a slice of a desired 3D object and including a registration aperture, at least one of the printed sheets having fibers therein, the placing the printed fibrous sheet including aligning the printed fibrous sheet with the another printed fibrous sheet via a registration pin aligned with the bed plate and extending through the registration aperture of the printed fibrous sheet;
   applying pressure to the stack of printed fibrous sheets with a guide plate in a first position pressed against the stack of printed fibrous sheets, the guide plate having an array of apertures extending vertically there through;
   reciprocating an array of felting needles held by a needle board and extending towards the bed plate through the guide plate array of apertures and a plurality of the printed fibrous sheets adjacent the guide plate, the reciprocating including inserting the felting needles through the array of apertures when the guide plate is in the first position and further inserting the felting needles through a plurality of the printed fibrous sheets adjacent the guide plate, the reciprocating further including withdrawing the felting needles out of the stack of printed fibrous sheets, the felting needles having a barb configured to intertwine fibers from one of the plurality of printed fibrous sheets of the stack through printed marking material on the printed fibrous sheets and with fibers of a neighboring printed fibrous sheet of the stack during the reciprocating.

10. The method of claim 9, further comprising the barb being an upward facing barb pulling the fibers from the one of the plurality of printed fibrous sheets of the stack into the neighboring printed fibrous sheet of the stack closer to the guide plate.

11. The method of claim 9, the reciprocating the array of felting needles further comprising the barb of one of the felting needles being a downward facing barb pushing fibers from the one of the plurality of printed fibrous sheets of the stack into the neighboring printed sheet of the stack closer to the bed plate with the barb, and another barb of another one of the felting needles being an upward facing barb pulling fibers from the one of the plurality of printed fibrous sheets of the stack into another neighboring printed sheet of the stack closer to the guide plate.

12. The method of claim 9, further comprising extending the registration pin from a base of a stacking device through the bed plate towards the guide plate to maintain operative alignment of the bed plate and the base.

13. The method of claim 9, wherein the apertures of the guide plate array of apertures have an elongated slotted shape across a surface plane of the bed plate, and further comprising laterally translating the needle board relative to the guide plate after a withdrawing of the array of felting needles out of the stack of printed fibrous sheets for a subsequent inserting through the plurality of printed fibrous sheets.

14. The method of claim 9, further comprising laterally translating both the guide plate and the needle board relative to the stack of printed fibrous sheets after a withdrawing of the array of felting needles out of the stack of printed fibrous sheets for a subsequent inserting through the plurality of printed fibrous sheets.

15. A stacker subsystem of an additive manufacturing system, comprising:
a punch holder aligned with a die holder, the punch holder configured to reciprocate towards and away from the die holder in a direction transverse to a delivery path for the printed substrate web fed between the punch holder and the die holder, the punch holder having a cavity therein with a cavity opening adjacent the die holder, the die holder having a channel there through corresponding with the cavity of the punch holder, the punch holder and the die holder configured to receive the printed substrate web there between, the printed substrate web including a plurality of printed fibrous sheets, each printed fibrous sheet patterned for a slice of a desired 3D object and including a registration aperture, at least one of the printed sheets having fibers therein;
a punch plate slidingly received within the cavity in a peripherally spaced relation, the punch plate configured to reciprocate in the direction transverse to the delivery path of the printed substrate web between a recessed position in the punch holder and a cutting position extended into the channel of the die holder to sever a substrate sheet from the printed substrate web, the severed substrate sheet being one of the plurality of printed fibrous sheets, the punch plate having an inner periphery wall defining an aperture; and
the printed sheet fiber entaglement apparatus of claim 1.

16. The stacker subsystem of claim 15, wherein the barb is an upwards facing barb configured to pull the fibers.

17. The stacker subsystem of claim 15, wherein the barb of one of the felting needle is an upward facing barb configured to pull the fibers, and the barb of a second one of the felting needles adjacent the one of the felting needles is a downward facing barb configured to push the fibers.

18. The stacker subsystem of claim 15, further comprising a stacking device including a base, the bed plate and the registration pin attached to the base and extending through the bed plate towards the guide plate to maintain operative alignment of the bed plate and the base.

19. The stacker subsystem of claim 15, wherein the apertures of the guide plate array of apertures have an elongated slotted shape across a surface plane of the bed plate, and the needle board is configured to translate laterally relative to the guide plate after a withdrawal of the array of felting needles out of the stack of printed fibrous sheets for a subsequent insertion through the plurality of printed fibrous sheets.

20. The stacker subsystem of claim 15, wherein both the guide plate and the needle board are configured to translate laterally relative to the stack of printed fibrous sheets after a withdrawal of the array of felting needles out of the stack of printed fibrous sheets for a subsequent insertion through the plurality of printed fibrous sheets.

\* \* \* \* \*